US007786900B2

(12) United States Patent
Bitar et al.

(10) Patent No.: US 7,786,900 B2
(45) Date of Patent: Aug. 31, 2010

(54) METHOD OF AIDING NAVIGATION FOR AIRCRAFT IN AN EMERGENCY SITUATION

(75) Inventors: Elias Bitar, Toulouse (FR); Nicolas Marty, Saint Sauveur (FR)

(73) Assignee: Thales (FR)

( * ) Notice: Subject to any disclaimer, the term of this patent is extended or adjusted under 35 U.S.C. 154(b) by 481 days.

(21) Appl. No.: 11/546,558

(22) Filed: Oct. 12, 2006

(65) Prior Publication Data

US 2007/0088492 A1    Apr. 19, 2007

(30) Foreign Application Priority Data

Oct. 14, 2005   (FR)   ................................. 05 10515

(51) Int. Cl.
*G01C 5/00* (2006.01)
(52) U.S. Cl. .................... 340/976; 340/645; 340/970; 340/995.1; 340/995.15; 340/995.17; 340/995.27; 701/1; 701/3; 701/4; 701/8; 701/16; 701/17; 701/18; 701/122; 701/208; 701/223; 701/225; 342/33; 342/36; 342/37; 342/38
(58) Field of Classification Search ............... 701/120, 701/1, 3, 4, 8, 16–18, 122, 208, 223, 225; 340/945, 970, 976, 995.1, 995.15, 995.17, 340/995.24, 995.27; 342/33, 36–38
See application file for complete search history.

(56) References Cited

U.S. PATENT DOCUMENTS

| | | | | |
|---|---|---|---|---|
| 6,219,592 B1 * | 4/2001 | Muller et al. | ................... | 701/9 |
| 6,311,108 B1 * | 10/2001 | Ammar et al. | ................. | 701/16 |
| 6,505,119 B2 * | 1/2003 | Schwaerzler | ................ | 701/210 |
| 6,573,841 B2 * | 6/2003 | Price | ........................... | 340/963 |
| 6,995,690 B1 * | 2/2006 | Chen et al. | .................. | 340/974 |
| 7,132,960 B2 * | 11/2006 | Glover | ....................... | 340/945 |
| 7,158,053 B2 * | 1/2007 | Crank | ........................ | 340/963 |
| 7,167,782 B2 * | 1/2007 | Humbard et al. | ............... | 701/3 |
| 7,216,069 B2 * | 5/2007 | Hett | .............................. | 703/6 |
| 7,433,781 B2 | 10/2008 | Bitar et al. | | |
| 7,453,375 B2 * | 11/2008 | Chamas et al. | .............. | 340/945 |

(Continued)

FOREIGN PATENT DOCUMENTS

FR    2 867 270    9/2005

(Continued)

OTHER PUBLICATIONS

"Distance Transformation in Digital Images", published in Journal: Computer Vision, Graphics and Image Processing, vol. 34 pp. 344-378 in Feb. 1986.

*Primary Examiner*—Khoi Tran
*Assistant Examiner*—Nikhil Sriraman
(74) *Attorney, Agent, or Firm*—Lowe Hauptman Ham & Berner, LLP

(57) ABSTRACT

Navigation of an aircraft is facilitated through the displaying on a map of an over flown region, and of the limits of zones within range of the aircraft in an emergency situation. The points of the zones within range of the aircraft are tagged on the basis of: an estimate of the vertical margins to reach these points, taking into account non-maneuverability zones neighboring the aircraft to be circumvented; a vertical flight profile to be complied with; and a safety height margin.

13 Claims, 9 Drawing Sheets

U.S. PATENT DOCUMENTS

| | | |
|---|---|---|
| 2002/0140578 A1 | 10/2002 | Price |
| 2003/0060940 A1 | 3/2003 | Humbard et al. |
| 2003/0193409 A1* | 10/2003 | Crank ........................ 340/970 |
| 2005/0273220 A1* | 12/2005 | Humbard et al. ................ 701/3 |
| 2007/0031007 A1 | 2/2007 | Bitar |
| 2007/0150117 A1 | 6/2007 | Bitar et al. |
| 2007/0150121 A1 | 6/2007 | Bitar et al. |
| 2008/0174454 A1 | 7/2008 | Bitar et al. |

FOREIGN PATENT DOCUMENTS

| | | | |
|---|---|---|---|
| FR | 2 867 270 A | | 9/2005 |
| JP | 05 039095 | | 2/1993 |
| JP | 05 039095 A | | 6/1993 |
| WO | WO/2005/031262 | * | 7/2005 |
| WO | WO/2005/069255 | * | 7/2005 |

* cited by examiner

METHOD OF AIDING NAVIGATION FOR AIRCRAFT IN AN EMERGENCY SITUATION

RELATED APPLICATIONS

The present application is based on, and claims priority from French Application Number 05 10515, filed Oct. 14, 2005, the disclosure of which is hereby incorporated by reference herein in its entirety.

FIELD OF THE INVENTION

The present invention relates to aids to the piloting of an aircraft in the event of an emergency operational situation, such as partial or total engine failure, so-called "full engine-out" or the loss of pressurization requiring a rapid descent, commonly referred to as "Drift Down."

The flight decks of aircraft are equipped with ever increasing high-performing devices for aiding navigation, displaying pop-up geographical maps showing the current position of the aircraft with respect to its geographical environment and the plot of the scheduled trajectory to its flight plan. To these geographical maps it is customary to add information about the potential risks of collisions with the ground by highlighting threatening elevations of ground surface (relief) detected by ground anti-collision systems or TAWS (Terrain Awareness Warning System). With this additional information, the navigation map alerts the crew of an aircraft as to the current situation of the aircraft with respect to any threatening relief and to regulated flyover zones, but does not clearly highlight the best course of action to get out of emergency situations, such as an engine failure.

BACKGROUND OF THE INVENTION

To improve the aid to piloting in a tricky situation, the applicant has already proposed in a French patent application registered on Sep. 24, 2004 under No. 04 10149, that the contours of risk zones displayed on a pop-up geographical map be supplemented with the displaying of external margins delimiting the close neighborhoods of the risk zones where the aircraft does not have complete freedom of lateral maneuver. The applicant has also proposed in a French patent application registered on Oct. 11, 2004 under No. 0411986 that a cartographic representation of an overflown region be displayed using colors corresponding to the vertical speeds required for a safe overflight.

This various additional information appearing on a pop-up geographical map facilitates navigation for the crew of an aircraft but is not especially suited to an unforeseen situation requiring the improvisation of a trajectory modification such as when an engine failure arises.

SUMMARY OF THE INVENTION

The present invention relates to apparatus and methods to provide a diversion (alternate) destination compatible with the flown over terrain and the performance of the aircraft at the time.

Disclosed embodiments relate to a method of aiding navigation for aircraft and include tagging, on a navigation map formulated on the basis of the elements of a terrain elevation database belonging to one and the same region of deployment, the contours of the zone or zones out of range of the aircraft by reason of crossing performance degraded by an obligation to lose altitude resulting from an exceptional emergency situation, such as engine failure or emergency descent for which the priority is the loss of altitude, even if the lateral trajectory must be adapted.

Advantageously, the out of range zones are regarded as sets of points of the navigation map that are assigned an estimate of vertical margin of height with respect to the flown over relief below an arbitrary threshold, in a map of vertical margins obtained by comparing the terrain altitude extracted from a database of terrain elevations and the altitude scheduled for the aircraft at this position of the map having regard to a preset vertical flight profile, corresponding to a minimum descent slope imposed by the obligation to lose altitude.

Advantageously, the map of vertical margins is established on the basis of a map of curvilinear distances obtained by applying a propagation distance transform to the points of a working image derived from the terrain elevations database with as origin, a point in the neighborhood of the current position of the aircraft, as static constraint, zones to be circumvented comprising non-maneuverable zones situated in the neighborhood of the current position of the aircraft, and as dynamic constraint the preset vertical flight profile with compliance with the vertical margin threshold.

Advantageously, when the map of vertical margins is established on the basis of a map of curvilinear distances, the set of points assigned estimates of curvilinear distance exhibiting discontinuities with respect to the points of the immediate neighborhood are regarded as out of range zones.

Advantageously, when the aircraft is equipped with a system for preventing ground collisions by formulating avoidance solutions, the lengths of the trajectories of the avoidance solutions proposed are compared with the estimates of curvilinear distances made during the determination of the out of range zones, so as to detect the circumventing of possible additional obstacles that have not been identified.

Advantageously, the non-maneuverable zones are determined as a function of the inertia, of the heading, of the course and of the speed of the aircraft as well as the performance of the aircraft in case of engine failure.

Advantageously, the contours displayed of the out of range zones include an external margin delimiting the neighborhoods of the out of range zones where the aircraft under an obligation to lose altitude does not have complete freedom of lateral deployment.

Advantageously, the contours of the out of range zones are endowed with a wire-like representation.

Advantageously, the contours of the out of range zones are endowed with a textured wire-like representation.

Advantageously, the contours of the out of range zones are endowed with a wire-like representation with interior and exterior borders of the different aspects.

Advantageously, the navigation map, on which the contours of the out of range zones are displayed, indicates zones provided by a ground collision prevention system, e.g., TAWS, as representing a danger.

BRIEF DESCRIPTION OF THE DRAWING

Other characteristics and advantages of the invention will emerge from the description below, of an embodiment of the invention given by way of example. This description will be offered in conjunction with the drawings in which:

FIG. 5 represents an exemplary chamfer mask usable by a propagation distance transform, FIGS. 6a, 6b show the cells of the chamfer mask represented in FIG. 5, which are used in a scan pass scanning in lexicographic order and in a scan pass scanning in inverse lexicographic order.

Figure 1:
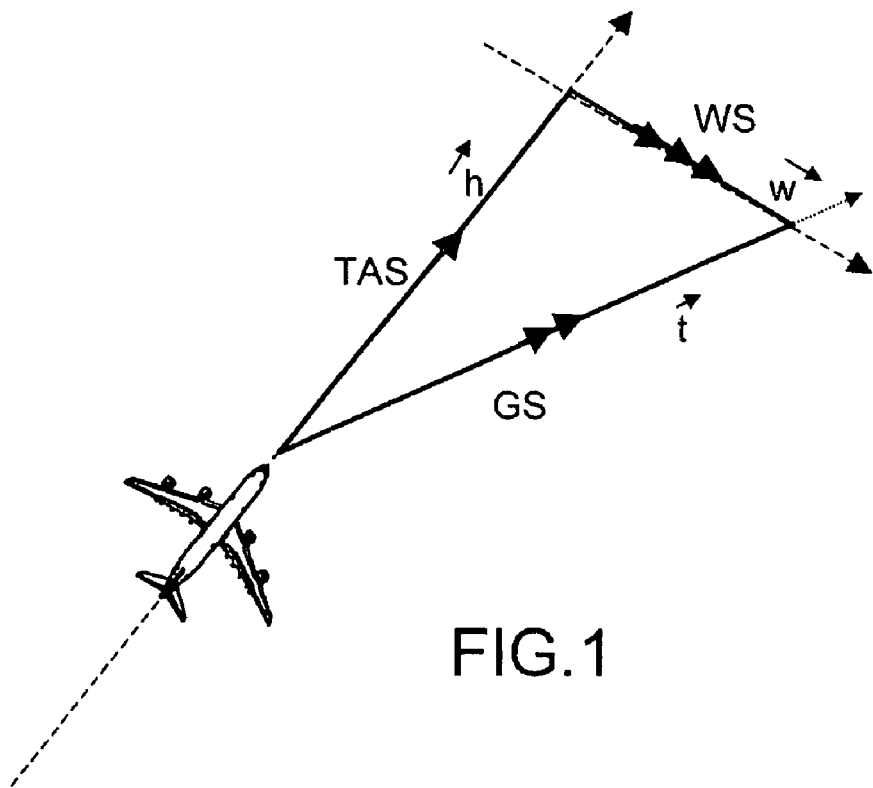
FIG. 1 illustrates the relations existing between the course and the heading followed by an aircraft.

In order to plot, on a pop-up navigation map, the contour of the domain accessible to an aircraft in case of engine failure, one begins, in a first step, by determining non-maneuverable zones situated in proximity to the current position of the aircraft and which are difficult to access on account of a lack of maneuverability resulting from an exceptional situation such as engine failure or depressurization imposing an emergency descent. In a second step, the zones out of range of the aircraft by reason of degraded crossing performance corresponding to an exceptional situation such as engine failure or depressurization imposing an emergency descent are determined on the basis of estimates of curvilinear distances in the presence of non-maneuverable zones and of the regulated flyover zones which are to be circumvented, and in the presence of a vertical flight profile and of a minimum threshold of vertical margin to be complied with. Finally, in a third step, the contours of the boundary between the zones within range and out of range of the aircraft are extracted and charted on a pop-up navigation map.

DETAILED DESCRIPTION OF THE DRAWING

The non-maneuverable zones are delimited, to the right and to the left of the current position of the aircraft, by the ground projection of the tightest possible lateral turning trajectories that are acceptable for the aircraft having regard to an exceptional situation of engine failure and a minimum of comfort to be complied with for the occupants of the aircraft.

As shown in FIG. 1, it is necessary to take account of the local wind in the determination of non-maneuverable zones. Specifically, the ground direction of the motion of an aircraft, which is that of its ground speed GS oriented along its course (or track) with a unit vector $\vec{t}$, corresponds to the direction of the vector sum of the air speed vector TAS of the aircraft, oriented along its heading with unit vector $\vec{h}$, and of the wind speed WS oriented along a unit vector $\vec{w}$.

Figure 2:
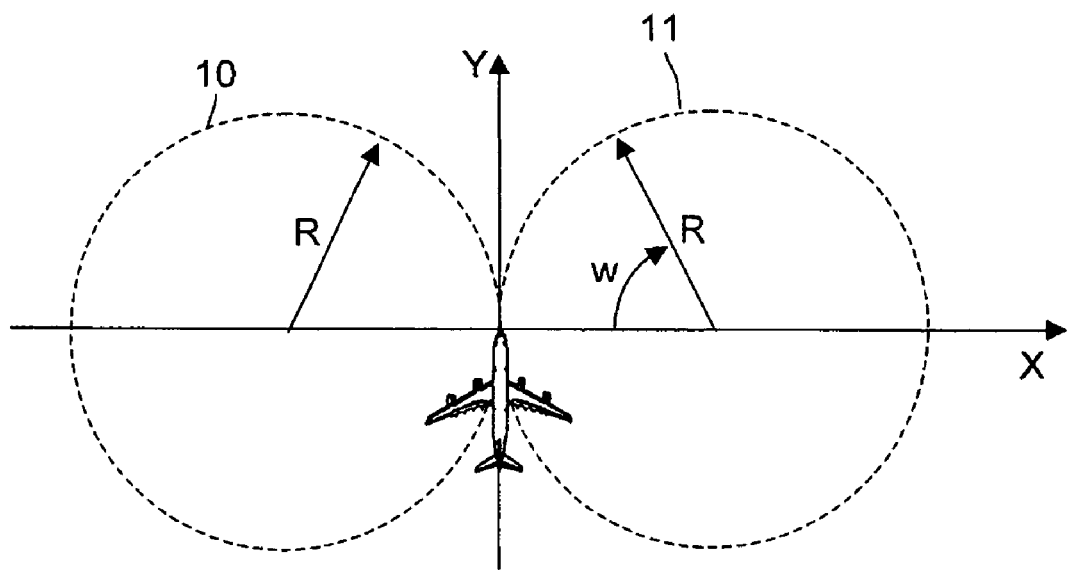
FIG. 2 illustrates, in an air reference frame tied to an aircraft, the lateral domains of circular shape, which are inaccessible from the aircraft by reason of the limits of its maneuverability.

With no wind, as shown in FIG. 2, the cells of the distance map that are placed in the neighborhood of the aircraft while being inaccessible thereto directly, are those contained inside two circles 10, 11 passing through the position of the aircraft, having a common tangent oriented along the heading of the aircraft (vector $\vec{Y}$) and a radius R corresponding to the smallest turning radius acceptable at the time. These circles 10, 11, which represent the tightest permitted turning trajectories, on one side and the other, for the aircraft, satisfy the system of parametric equations:

$$\begin{pmatrix} x \\ y \end{pmatrix}(t) = \begin{pmatrix} \delta \cdot R \cdot [1 - \cos(wt + \gamma)] \\ R \cdot \sin(wt + \gamma) \end{pmatrix}$$

with $$R = \frac{TAS^2}{g \cdot \tan\varphi_{roll}}$$

$$w = \frac{TAS}{R} = \frac{g \cdot \tan\varphi_{roll}}{TAS}$$

$\varphi_{roll}$ being the angle of roll of the aircraft during the maneuver, $\gamma$ being a factor dependent on the initial conditions, $\delta$ being a coefficient equal to +1 for a turn to the right and −1 for a turn to the left.

The air speed of the aircraft, when it traverses these circles may then be written:

$$\begin{pmatrix} \dot{x} \\ \dot{y} \end{pmatrix}(t) = \begin{pmatrix} \delta \cdot Rw \cdot \sin(wt + \gamma) \\ Rw \cdot \cos(wt + \gamma) \end{pmatrix} \quad (1)$$

Assuming that the wind is constant in speed and direction, the circles 10, 11 leave a cycloid-shaped trace on the ground. The system of parametric equations of this trace may be obtained by integrating the system of parametric equations for the air speed of traversal over the circles.

When the wind is taken into account, the system (1) of parametric equations for the speed of the aircraft, expressed in a ground reference frame X Y whose ordinate axis Y is oriented along the heading of the aircraft, becomes:

$$\begin{pmatrix} \dot{x} \\ \dot{y} \end{pmatrix}(t) = \begin{pmatrix} \delta \cdot Rw \cdot \sin(wt + \gamma) + WS_X \\ Rw \cdot \cos(wt + \gamma) + WS_Y \end{pmatrix} \quad (2)$$

$\begin{pmatrix} WS_X \\ WS_Y \end{pmatrix}$ being the wind vector

By integration, we obtain, in this ground reference frame, the system of parametric equations for the trace:

$$\begin{pmatrix} x \\ y \end{pmatrix}(t) = \begin{pmatrix} WS_X \cdot t - \delta \cdot R \cdot \cos(wt + \gamma) + C_X \\ WS_Y \cdot t + R \cdot \sin(wt + \gamma) + C_Y \end{pmatrix}$$

$C_x$ and $C_y$ being integration constants which depend on the reference frame considered.

In an air reference frame $X_h$, $Y_h$, whose ordinate axis Y is oriented along the heading of the aircraft, the system of parametric equations (1) becomes:

$$\begin{pmatrix} \dot{x} \\ \dot{y} \end{pmatrix}_{t=0} = \begin{pmatrix} \delta \cdot Rw \cdot \sin(wt+\gamma) + WS_{Xh} \\ Rw \cdot \cos(wt+\gamma) + WS_{Y_h} \end{pmatrix} \quad (3)$$

By integration, it gives, in this air reference frame, the system of parametric equations for the trace:

$$\begin{pmatrix} x \\ y \end{pmatrix}_h (t) = \begin{pmatrix} WS_{Xh} \cdot t - \delta \cdot R \cdot \cos(wt+\gamma_h) + C_{Xh} \\ WS_{Yh} \cdot t + R \cdot \sin(wt+\gamma_h) + C_{Yh} \end{pmatrix} \quad (4)$$

The initial condition regarding position is:

$$\begin{pmatrix} x \\ y \end{pmatrix}_{t=0} = \begin{pmatrix} 0 \\ 0 \end{pmatrix} \quad (5)$$

since the aircraft is initially at the centre of the reference frame.

The initial conditions regarding the speeds give $$\begin{cases} \cos(\gamma_h) = 1 \\ \sin(\gamma_h) = 0 \end{cases} \Rightarrow \gamma_h = 0 \quad (6)$$

Finally the constants may be written:

$\gamma_h = 0; C_{Xh} = \delta.R$ and $C_{Y_h} = 0$

Figure 3:
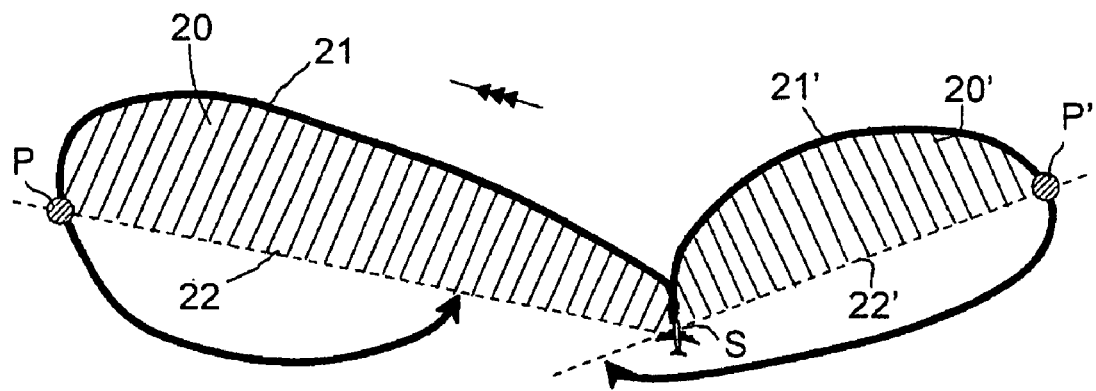
FIG. 3 shows the ground traces of the lateral domains illustrated in FIG. 2, in the presence of a local wind.

As shown in FIG. 3, for the delimitation of the non-maneuverable zones 20, 20' on either side of the current position of the aircraft S, use is made of the first cycloidal arc 21, 21' of the ground trace of each of the two tightest right and left lateral turns permitted by the residual performance of the aircraft in case of an engine failure, halted at the points P, P' corresponding to the moment at which the change of course attained is 180° and supplemented with straight line segments 22, 22' leading to the current position of the aircraft.

Once delimited, the non-maneuverable zones are charted together with the regulated flyover zones on a geographical locating grid which employs the meshing or a sub-multiple of the meshing used by a terrain elevation database serving to establish a pop-up map of the zone of deployment of the aircraft for display in the cockpit of the aircraft. The mesh cells of this locating grid define the pixels of a working image to which is applied, with static and dynamic constraints, a propagation distance transform so as to obtain the estimates of curvilinear distances allowing the determination of the zones out of range of the aircraft in case of engine failure. This geographical locating grid may be:
 a regular grid distance-wise, aligned with the meridians and parallels,
 a regular grid distance-wise aligned with the heading of the aircraft,
 a regular grid distance-wise aligned with the course of the aircraft,
 a regular grid angular-wise, aligned with the meridians and parallels,
 a regular grid angular-wise, aligned with the heading of the aircraft,
 a regular grid angular-wise aligned with the course of the aircraft.
 a polar (radial) representation centered on the aircraft and its heading,
 a polar (radial) representation centered on the aircraft and its course.

In the subsequent description, a locating grid that is regular distance-wise is used, aligned with the meridians and parallels, and defined by its North-West ($NW_{LAT}$ and $NW_{LON}$) and South-East ($SE_{LAT}$, $SE_{LON}$) corners, with angular resolution $RES_{LAT}$ on the latitude axis and $RES_{LON}$ on the longitude axis. In the figures, the proportions between the mesh cells of the locating grid and the surface areas of the zones with restricted flow are not complied with so as to improve readability.

Figure 4:
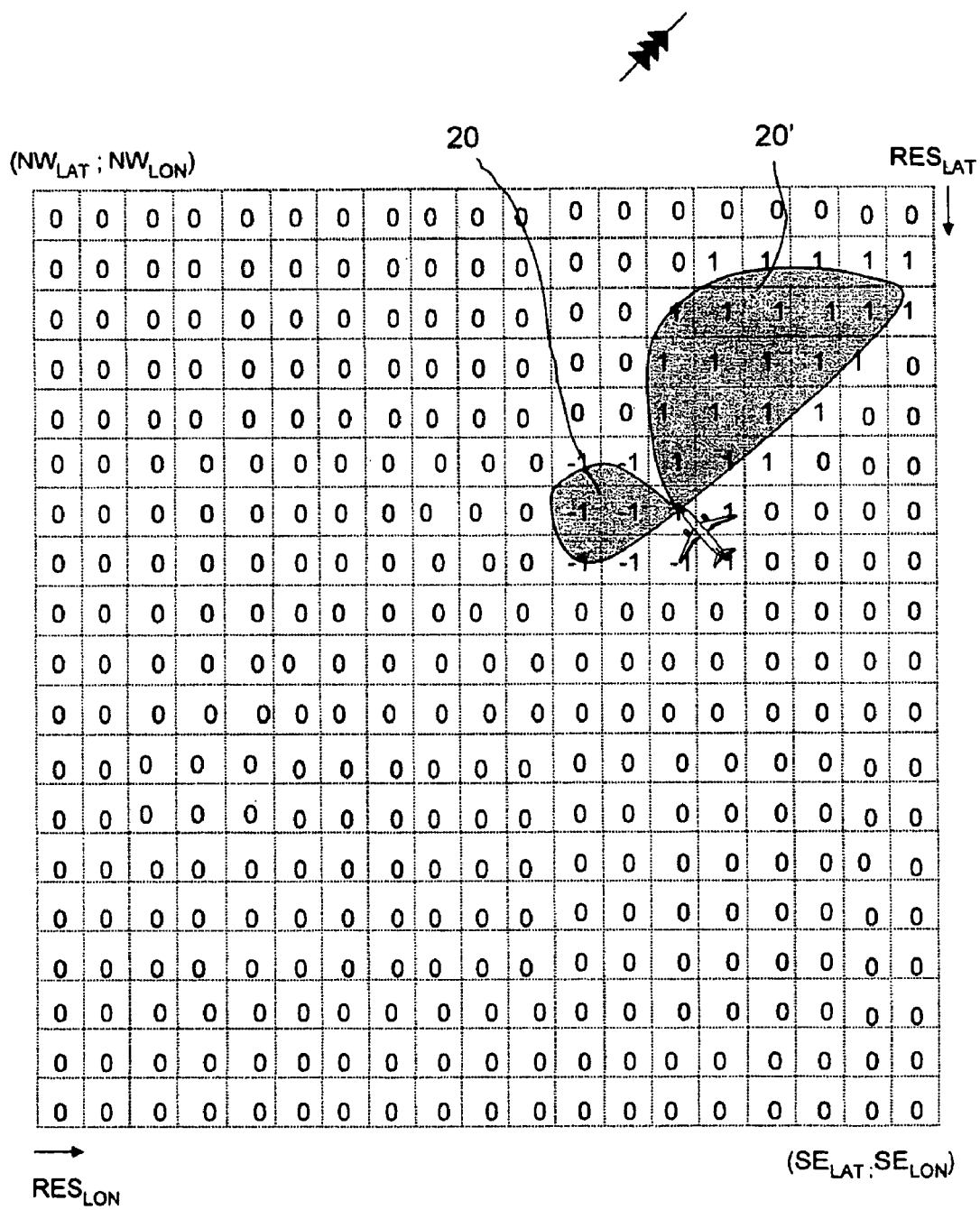
FIG. 4 illustrates an exemplary tagging by geographical locating grid, of non-maneuverable zones situated in the neighborhood of the current position of the aircraft.

FIG. 4 shows an exemplary tagging by geographical locating grid of the non-maneuverable zones 20, 20' tied to the current position of the aircraft. In this tagging, the mesh cells of the geographical locating grid are assigned a quantity whose value is dependent on the geographical location of the mesh cell with respect to the non-maneuverable zones 20, 20', a value 1 indicating that the mesh cell considered intercepts or is included in one of these zones, a value 0 that the mesh cell is outside the inaccessible zones.

Distance transforms often referred to as propagation or chamfer mask transforms make it possible to estimate curvilinear distances between objects or between an origin point, the so-called source point and a destination point while taking account of constraints such as obstacles to be circumvented. The French patent application filed by the Applicant on Sep. 24, 2003, under No. 0311320 gives an exemplary use thereof to estimate the distance from an aircraft to the various points of a zone of deployment that are selected from a terrain elevation database while taking account of a vertical flight profile imposed on the aircraft.

Chamfer mask distance transforms appeared initially in image analysis to estimate distances between objects. Gunilla Borgefors describes examples thereof in her article entitled "Distance Transformation in Digital Images." published in the journal: Computer Vision, Graphics and Image Processing, Vol. 34 pp. 344-378 in February 1986.

The distance between two points of a surface is the minimum length of all the possible journeys over the surface starting from one of the points and ending at the other. In an image formed of pixels distributed according to a regular mesh of lines, columns and diagonals, a propagation distance transform estimates the distance of a pixel called the "goal" pixel with respect to a pixel called the "source" pixel by constructing progressively, starting from the source pixel, the shortest possible path according to the meshing of the pixels and ending at the goal pixel, and while being aided by the distances found for the image pixels already analyzed and by a so-called chamfer mask array cataloguing the values of the distances between a pixel and its near neighbors.

Figures 5, 6A, 6B:
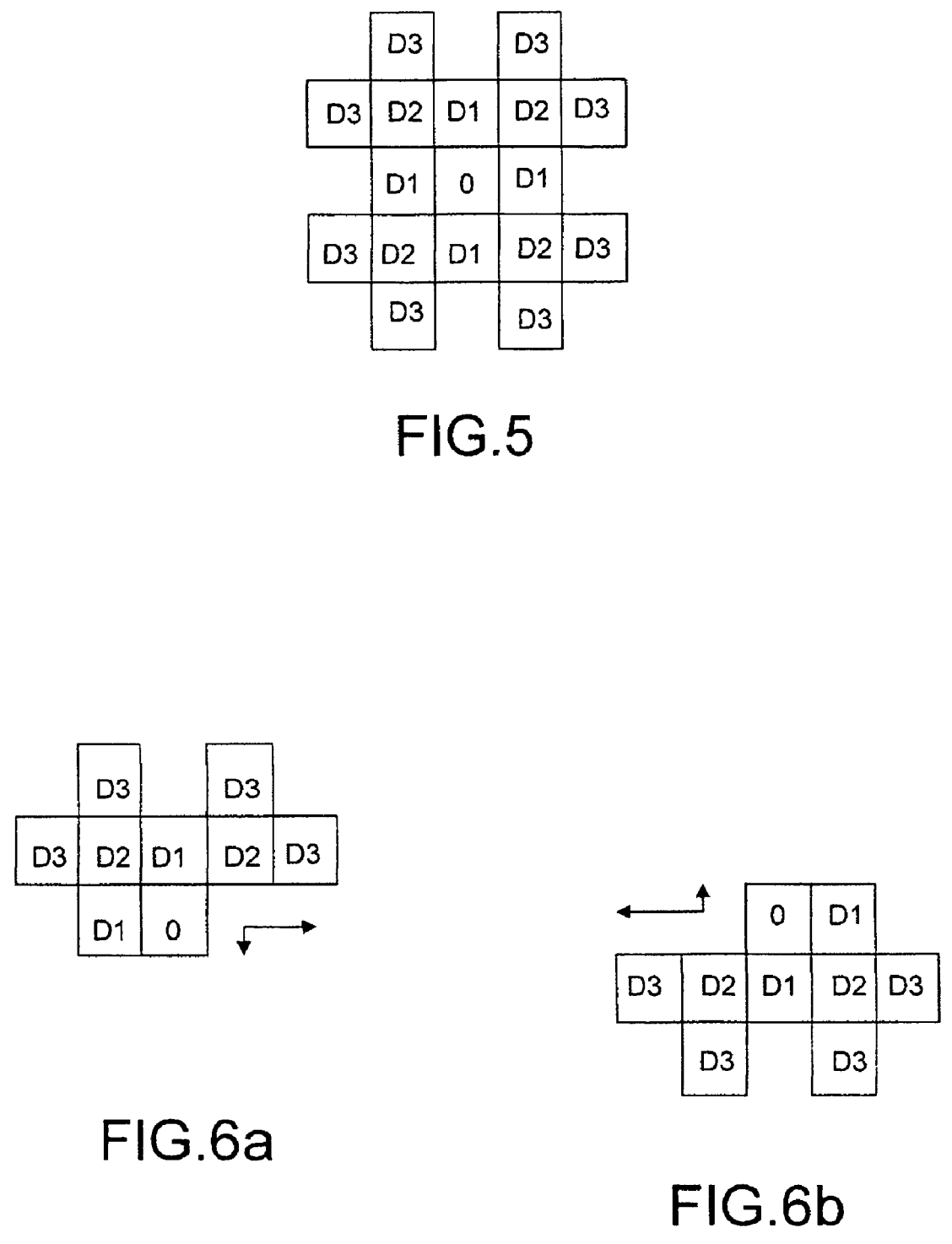

As shown in FIG. 5, a chamfer mask takes the form of an array with an arrangement of boxes reproducing the pattern of a pixel surrounded by its near neighbors. At the centre of the pattern, a box assigned the value 0 tags the pixel taken as origin of the distances catalogued in the array. Around this central box, are clustered peripheral boxes filled with nonzero proximity distance values and employing the arrangement of the pixels of the neighborhood of a pixel assumed to occupy the central box. The proximity distance value appearing in a peripheral box is that of the distance separating a pixel occupying the position of the peripheral box concerned, from a pixel occupying the position of the central box. It is noted that the proximity distance values are distributed as concentric circles. A first circle of four boxes corresponding to the four pixels of first rank, which are the nearest to the pixel of the central box, either on the same line, or on the same column, are assigned a proximity distance value D1. A second circle of four boxes corresponding to the four pixels of second rank, which are pixels nearest the pixel of the central box that are placed on the diagonals, are assigned a proximity distance value D2. A third circle of eight boxes corresponding to the eight pixels of third rank, which are nearest the pixel of the central box while remaining off the line, the column and the diagonals occupied by the pixel of the central box, are assigned a proximity distance value D3.

The chamfer mask can cover a more or less extensive neighborhood of the pixel of the central box by cataloguing the values of the proximity distances of a greater or lesser number of concentric circles of pixels of the neighborhood. It can be reduced to the first two circles formed by the pixels of the neighborhood of a pixel occupying the central box or be extended beyond the first three circles formed by the pixels of the neighborhood of the pixel of the central box. It is customary to stop at the first three circles as for the chamfer mask shown in FIG. 5.

The values of the proximity distances D1, D2, D3 which correspond to Euclidian distances are expressed in a scale whose multiplicative factor permits the use of integers at the cost of a certain approximation. Thus, G. Borgefors adopts a scale corresponding to a multiplicative factor of 3 or 5. In the case of a chamfer mask retaining the first two circles of proximity distance values, hence of dimensions 3×3, G. Borgefors gives, to the first proximity distance D1 which corresponds to an echelon in terms of abscissa or ordinate and also to the multiplicative scale factor, the value 3 and, to the second proximity distance which corresponds to the root of the sum of the squares of the echelons in abscissa and ordinate $\sqrt{x^2+y^2}$, the value 4. In the case of a chamfer mask retaining the first three circles, hence of dimensions 5×5, she gives, to the distance D1 which corresponds to the multiplicative scale factor, the value 5, to the distance D2, the value 7 which is an approximation of $5\sqrt{2}$, and to the distance D3 the value 11 which is an approximation of $5\sqrt{5}$.

The progressive construction of the shortest possible path going to a goal pixel starting from a source pixel and following the meshing of the pixels is done through a regular scanning of the pixels of the image by means of the chamfer mask.

Initially, the pixels of the image are assigned an infinite distance value, in fact a number high enough to exceed all the values of the distances measurable in the image, with the exception of the source pixel or pixels which are assigned a zero distance value. Next, the initial distance values assigned to the goal points are updated during the scanning of the image by the chamfer mask, an update consisting in replacing a distance value allocated to a goal point with a new lesser value resulting from a distance estimate made on the occasion of a new application of the chamfer mask to the goal point considered.

A distance estimation by applying the chamfer mask to a goal pixel consists in cataloguing all the paths going from this goal pixel to the source pixel and passing through a pixel of the neighborhood of the goal pixel whose distance has already been estimated during the same scan, in searching among the catalogued paths for the shortest path or paths and in adopting the length of the shortest path or paths as distance estimate. This is done by placing the goal pixel whose distance one wishes to estimate in the central box of the chamfer mask, selecting the peripheral boxes of the chamfer mask corresponding to pixels of the neighborhood whose distance has just been updated, by calculating the lengths of the shortest paths connecting the goal pixel to be updated to the source pixel while passing through one of the selected pixels of the neighborhood, by addition of the distance value assigned to the pixel of the neighborhood concerned and of the proximity distance value given by the chamfer mask, and in adopting, as distance estimate, the minimum of the path length values obtained and of the old distance value assigned to the pixel undergoing analysis.

At the level of a pixel under analysis by the chamfer mask, the progressive search for the shortest possible paths starting from a source pixel and going to the various goal pixels of the image gives rise to a phenomenon of propagation towards the pixels that are the nearest neighbours of the pixel under analysis and whose distances are catalogued in the chamfer mask. In the case of a regular distribution of the pixels of the image, the directions of the nearest neighbors of a pixel not varying are considered as axes of propagation of the chamfer mask distance transform.

The order of scanning of the pixels of the image influences the reliability of the distance estimates and of their updates because the paths taken into account depend thereon. In fact, it is subject to a regularity constraint which means that if the pixels of the image are tagged in lexicographic order (pixels ranked in a line-by-line increasing order starting from the top of the image and progressing towards the bottom of the image, and from left to right within a line), and if a pixel p has been analyzed before a pixel q then a pixel p+x must be analyzed before the pixel q+x. The lexicographic, inverse lexicographic (scanning of the pixels of the image line by line from bottom to top and, within a line, from right to left), transposed lexicographic (scanning of the pixels of the image column by column from left to right and, within a column, from top to bottom), inverse transposed lexicographic (scanning of the pixels in columns from right to left and within a column from bottom to top) orders satisfy this regularity condition and more generally all the scans in which the lines and columns are scanned from right to left or from left to right. G. Borgefors advocates a double scan of the pixels of the image, once in lexicographic order and then again in inverse lexicographic order.

The analysis of the image by means of the chamfer mask may be done according to a parallel process or a sequential process. For the parallel process, one considers the distance propagations from all the points of the mask that are made to pass over the entire image in several scans until there is no longer any change in the distance estimates. For the sequential process, the distance propagations are considered only from half the points of the mask. The upper half of the mask is made to pass over all the points of the image through a scan in lexicographic order and then the lower half of the mask over all the points of the image in inverse lexicographic order.

FIG. 6a shows, in the case of the sequential process and of a scan pass scanning in lexicographic order going from the upper left corner to the lower right corner of the image, the boxes of the chamfer mask of FIG. 5 that are used to catalogue the paths going from a goal pixel placed on the central box (box indexed by 0) to the source pixel, passing through a pixel of the neighborhood whose distance has already been the subject of an estimation in the course of the same scan. These boxes are eight in number, arranged in the upper left part of the chamfer mask. There are therefore eight paths catalogued for the search for the shortest whose length is taken as distance estimate.

FIG. 6b shows, in the case of the sequential process and of a scan pass scanning in inverse lexicographic order going from the bottom right corner to the top left corner of the image, the boxes of the chamfer mask of FIG. 5 that are used to catalogue the paths going from a goal pixel placed on the central box (box indexed by 0) to the source pixel, passing through a pixel of the neighborhood whose distance has already been the subject of an estimation in the course of the same scan. These boxes are complementary to those of FIG. 6a. They are also eight in number but arranged in the bottom right part of the chamfer mask. There are therefore again eight paths catalogued for the search for the shortest whose length is taken as distance estimate.

The propagation distance transform whose principle has just been recalled briefly was designed originally for the analysis of the positioning of objects in an image but it was soon applied to the estimation of distances on a relief map extracted from a terrain elevation database with regular meshing of the terrestrial surface. Specifically, such a map does not explicitly have a metric since it is plotted on the basis of the elevations of the points of the meshing of the terrain elevation database of the zone represented. In this context, the propagation distance transform is applied to an image whose pixels are the elements of the database of elevations of the terrain belonging to the map, that is to say, of the elevation values associated with the latitude, longitude geographical coordinates of the nodes of the mesh where they have been measured, ranked, as on the map, by increasing or decreasing latitude and longitude according to a two-dimensional array of latitude and longitude coordinates.

For terrain navigation of mobile craft such as robots, the chamfer mask distance transform is used to estimate curvilinear distances taking account of zones to be circumvented by reason of their rugged configurations or of a prohibition of regulatory origin. To do this, an attribute of a zone to be circumvented may be associated with the elements of the terrain elevation database serving to establish the map of the terrain of deployment of the craft. This attribute signals, when it is activated, all the points of the zones to be circumvented and precludes any update other than an initialization, of the distance estimate made by the chamfer mask distance transform at these points.

For an aircraft, the estimates of curvilinear distance do not take into account, among the routes avoiding the zones to be circumvented, any other than those giving the possibility of complying with an arbitrary vertical flight profile preset.

Figure 7:
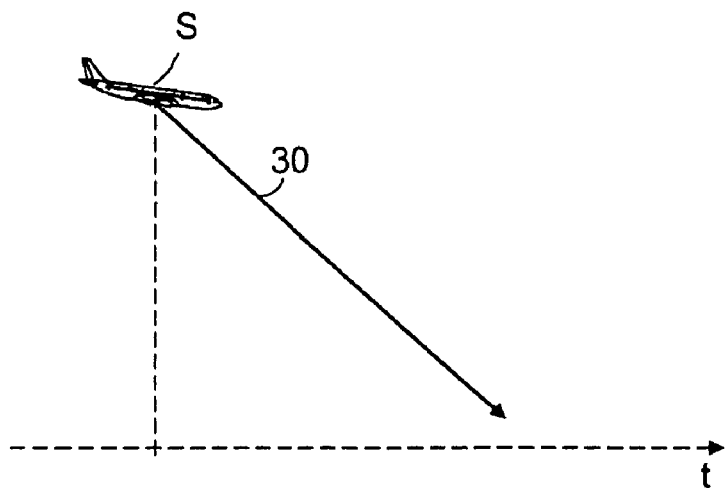
FIG. 7 illustrates a vertical flight profile corresponding to an engine failure.

In the case of an aircraft in an emergency situation such as an engine failure, the zones to be circumvented, a priori, are the zones of non-maneuverability and the regulated flyover zones. Thus, the image to which the chamfer mask distance transform is applied is that of FIG. 4 supplemented with the regulated flyover zones. The preset vertical flight profile is in accordance with the minimum descent slope compatible with an engine failure for the aircraft considered. This flight profile may be a simple rectilinear segment following the minimum descent slope 30 (see FIG. 7), or a more complex curve taking account of the alterations in the performance of the aircraft as a function of altitude. The profile addresses the accessibility of a considered point because the altitude, of the aircraft at this point after having traversed a joining path of minimum length while complying with the imposed vertical flight profile, remains greater than the elevation of that point as it appears in the terrain elevation database, increased by a safety margin. A result of the above is a propagation of an altitude measurement during the application of the distance transform, that is added to the distance measurement propagation, and which is used to validate an estimate of curvilinear distance.

Ultimately, the points belonging to zones that are out of range because they are above the aircraft's crossing performance degraded by an engine failure occur again with estimated curvilinear distances that are much greater than the sight distances, thereby making it possible to distinguish them rapidly from the other points of the region selected for the working image. The threshold adopted for accepting that a point belongs to a zone out of range of the aircraft may be the maximum distance by sight of the points furthest from the region selected for the working image.

The validation of a curvilinear distance estimate which rests upon the fact that the destination point does not belong to a zone to be circumvented and on a propagated altitude that is greater than the destination point altitude increased by a safety margin, may be rendered more severe by the application of other conditions such as an absence of discontinuities with respect to the curvilinear distance estimates made for the points near the destination point, such discontinuities signaling ruggedness of the reliefs circumvented by the distance propagation, as is described in Applicant's French patent application registered on 19 Mar. 2004 under No. 04 02870.

Figure 8:
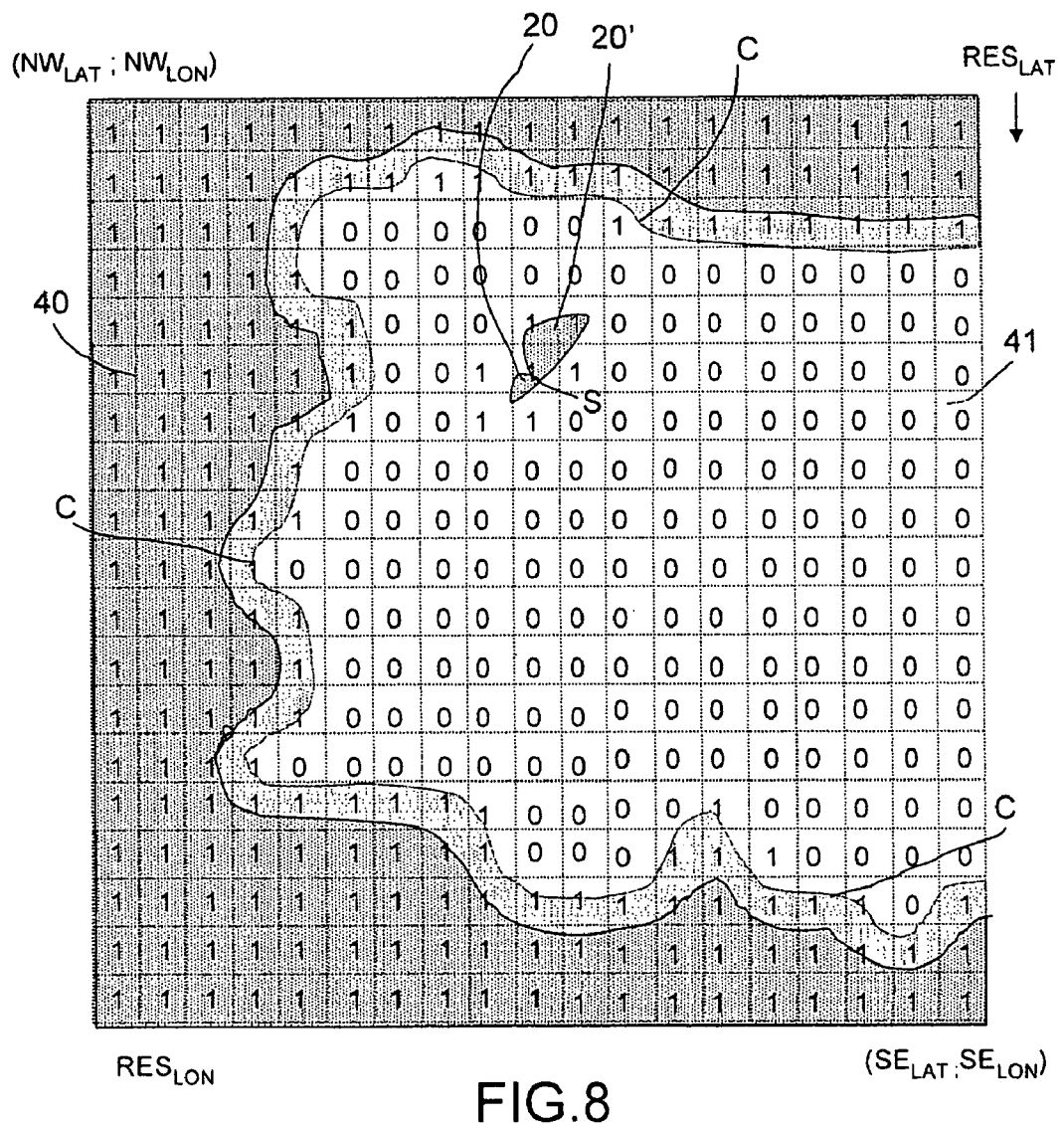
FIG. 8 illustrates an exemplary tagging on the same geographical locating grid as FIG. 4, of zones out of range of an aircraft in case of engine failure.

FIG. 8 illustrates an exemplary dividing of the region selected for the working image into the two types of zones: within range and out of range of the aircraft. As in the case of FIG. 4, the mesh cells of the geographical locating grid that intercept, or are included in a zone 40 inaccessible from the aircraft, (because it is out of range), are assigned a quantity of value 1. The other mesh cells completely included in zones 41 are accessible since they are within range of the aircraft, and are assigned a quantity 0.

The non-maneuverable zones 20, 20' which are represented in this FIG. 8, either side of the current position of the aircraft S are not accepted as out of range unless the difference in height of the aircraft at its current position with respect to the elevations of their points is insufficient to allow the aircraft affected by an engine failure, to perform a change of heading that is significant, for example of more than 180°.

For safety, the out of range zones thus obtained may be supplemented with a lateral margin C which takes account of the possibilities of limitation to the freedom of lateral maneuver that are due to the presence, if any, of reliefs in the out of range zones.

The width of this lateral margin C may be defined in various ways.

It may have a fixed width, for example of five nautical miles, which value is required for the lateral margins vis-á-vis reliefs by the procedures to be applied in the case of emergency descent or correspond to the value of the lateral-wise precision of the trajectory tracking by the onboard equipment of the aircraft termed RNP (the initials standing for the expression "Required Navigation Performance").

It may also depend on the turning performance of the aircraft in an emergency situation, here an engine failure. In this case, the width of the margin is the minimum lateral distance $MLTD_{TURN}$ sufficient to allow the aircraft to traverse a diversion aerodrome on either side of its current trajectory.

Figure 9:
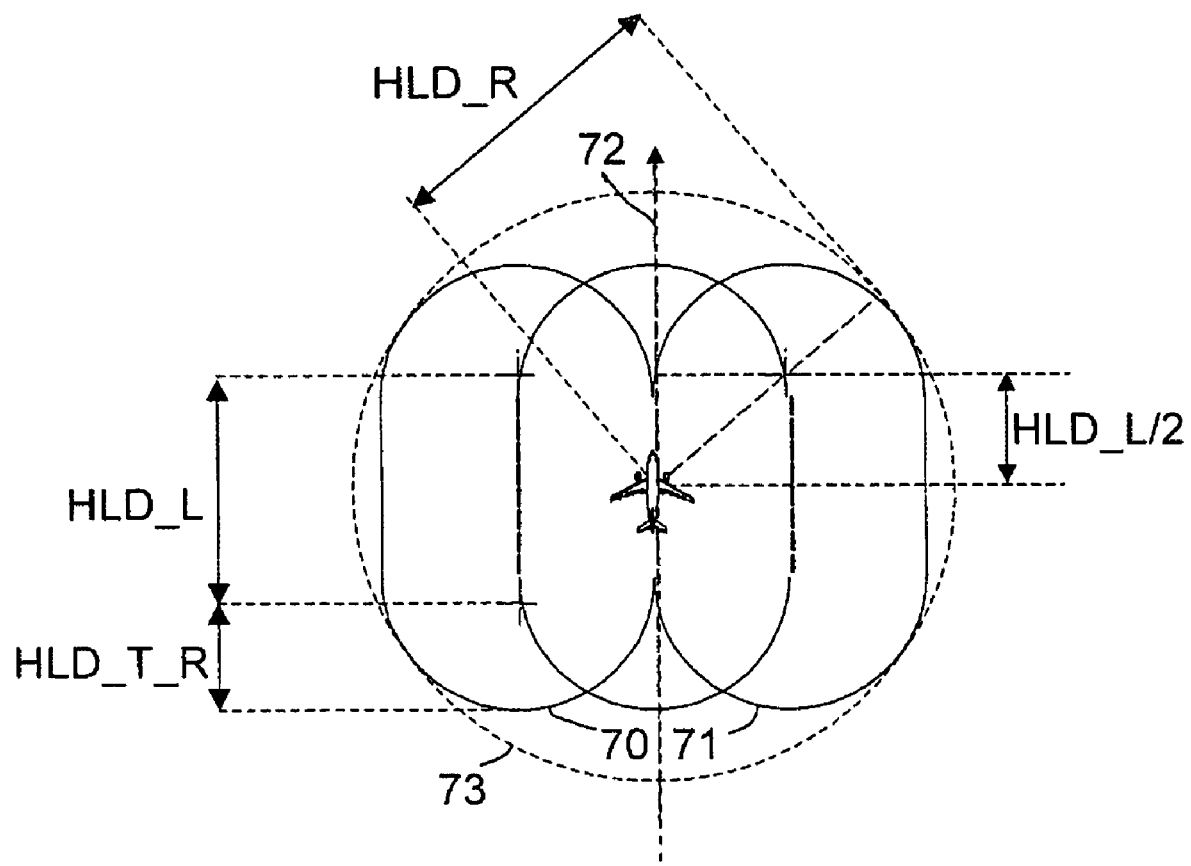
FIG. 9 shows the plots of the two diversion aerodromes used to determine the width required by an aircraft to be able to freely engage lateral maneuvers.

The minimum lateral distance $MLTD_{TURN}$ corresponds to the radius of the circle circumscribed about the two possible trajectories for the diversion aerodrome increased by a safety margin. As shown in FIG. 9, the two possible trajectories 70, 71 for the diversion aerodrome form two lobes tangential to the current trajectory 72 of the aircraft. Each of them comprises two lengths HLD_L joined by two half-turns of radius HLD_T.

In what follows, no attention is paid to the loss of altitude since the traversal of the aerodrome lies entirely in a zone within range of the aircraft, that is to say all of whose points may be reached by the aircraft with the safety height margin.

The value of the lengths HLD_L is a configuration data item defined in terms of flight time or distance traversed on the ground. The value of the radius HLD_T of the half-turns assumed to be performed flat, at ground speed GS and at constant roll angle HLD_B, satisfies the relation:

$$HLD\_T = \frac{GS^2}{g \times \tan(HLD\_B)}$$

the ground speed GS being a data item provided by the equipment of the aircraft, HLD_B a configuration data item calculated as a function of the theoretical performance of the aircraft and g the acceleration due to gravity.

The value of the radius HLD_R of the circle 73 circumscribed about the two possible trajectories 70, 71 for the diversion aerodrome, satisfies the relation:

$$HLD\_R = HLD\_T + \sqrt{\left(\frac{HLD\_L}{2}\right)^2 + HLD\_T^2}$$

Ultimately, the minimum lateral distance $MLTD_{TURN}$ takes the value:

$$MLTD_{TURN} = HLD\_M + HLD\_T + \sqrt{\left(\frac{HLD\_L}{2}\right)^2 + HLD\_T^2}$$

HLD_M being an additional safety margin with respect to the radius HLD_R of the circle circumscribed about the two possible trajectories of the diversion aerodrome.

Figure 10:
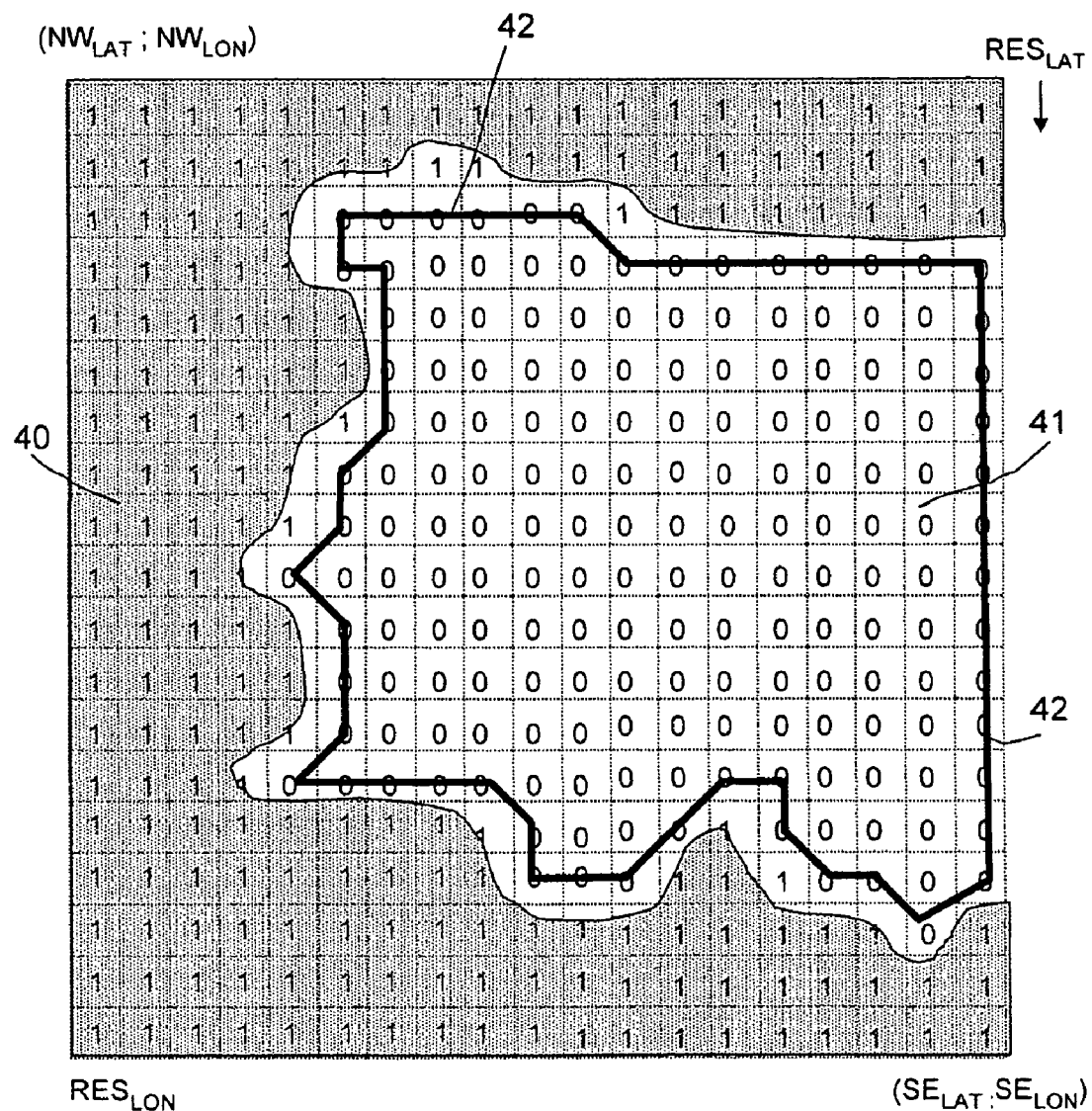
FIG. 10 illustrates an exemplary process for plotting the contours of out of range zones shown in FIG. 8.

As shown in FIG. 10, the plot of the boundary 42 between the zones 41 within range and the zones 40 out of range of the aircraft in case of engine failure may be obtained through a polygonal extraction searching for the polygonal contour encompassing a maximum of mesh cells with quantity of value 0 while excluding any mesh cell with quantity of value 1. It can also be obtained by a curvilinear extraction searching for a contour based on arcs of circles and straight lines still encompassing a maximum of mesh cells of quantity 0 while excluding any mesh cell with quantity of value 1, the radii of the circular arcs representing the maximum distance crossable in their direction by the aircraft affected by an engine failure. The representation of these limits on a pop-up navigation map displayed in the cockpit of an aircraft is preferably a wire-like representation which can be superimposed on preexisting information. This representation may be a simple wire-like, textured wire-like representation or a wire-like representation with exterior and interior borders.

Figure 11:
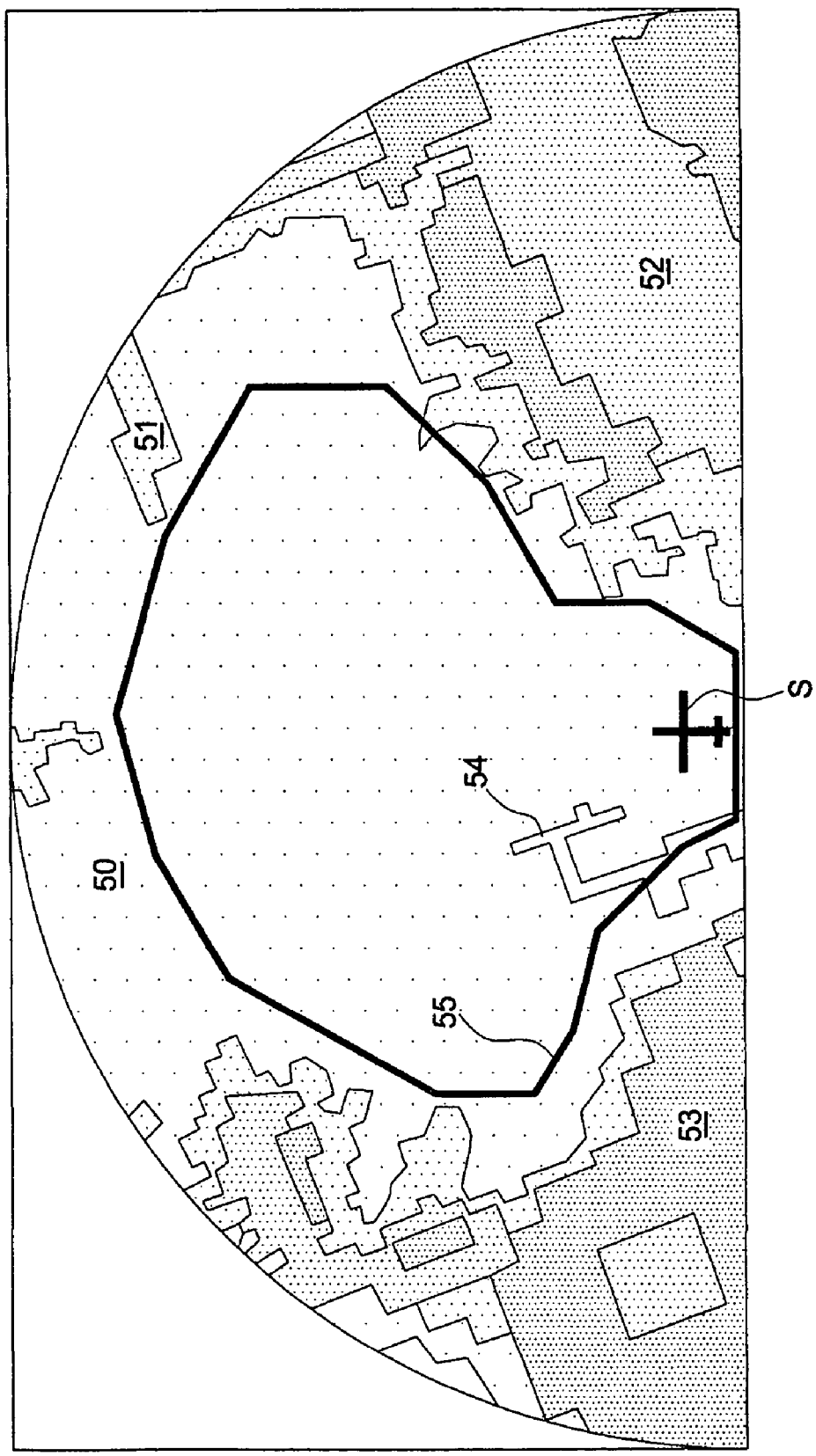
FIG. 11 shows an exemplary display on a navigation screen of a pop-up map displaying the contours of the zones out of range of an aircraft in case of engine failure.

FIG. 11 gives an exemplary display as a wire-like representation, of the limits of the zone within range of the aircraft in case of engine failure, on a pop-up navigation map formulated by a system TAWS for preventing collisions with the ground. Distinguished therein is a map background breaking down the flown over region into four types of zones represented by colors: a first type 50 represented in black with no threatening relief because it is well below the current altitude of the aircraft, a second type 51 represented in green with no threatening relief but with terrain elevations approaching the current altitude of the aircraft, a third type 52 represented in yellow with reliefs to be considered since they have terrain elevations within the span of the current altitude of the aircraft and a fourth type 53 represented in red with threatening reliefs exceeding the current altitude of the aircraft. In FIG. 10, which is in black and white, the colors are replaced by different textures. Apart from these three types of regions, the pop-up navigation map gives useful information such as the location 54 of airports. In the example represented, the aircraft is deploying in a mountainous zone and the display of the limits 55 of the zone within range of the aircraft in case of engine failure shows its crew that it will have the possibility of making it to the airport 54 in the case of a sudden engine failure.

Other types of display are conceivable. It is in particular possible to endow, inside the limits 55 of the zones within range of the aircraft in case of engine failure, the first type 50 of zones without threatening relief, with a more intricate representation with a gradation of colors representative of the height margin remaining once a point has been reached, still under the assumption of an engine failure.

Figure 12:
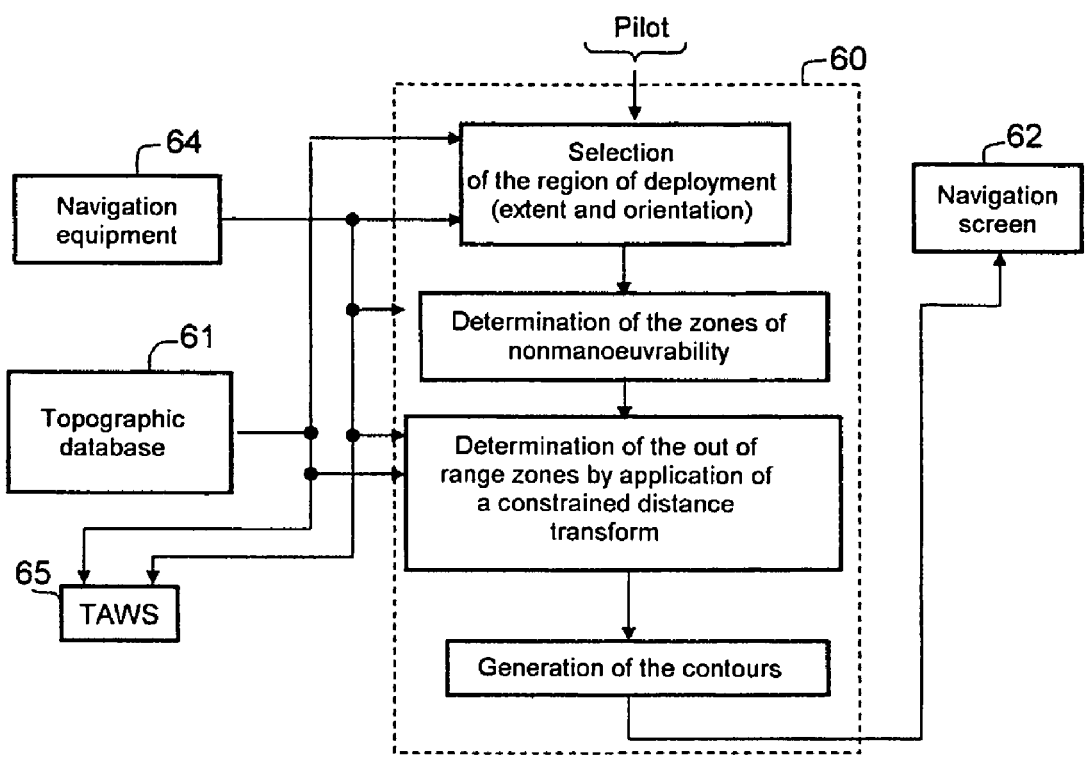
FIG. 12 represents a diagram of a device for aiding navigation according to the invention.

FIG. 12 shows a device for implementing the method for aiding navigation just described. This device is composed essentially of a computer 60 associated with a database of elevations of the terrain and of regulated flyover zones 61 and with visual display devices 62. The database of elevations of the terrain and of regulated flyover zones 61 is represented as being onboard the aircraft but it may equally well be placed on the ground and accessible from the aircraft by radio transmission. The computer 60 may be a computer specific to aiding navigation or a computer shared with other tasks such as flight management, the flight director or the automatic pilot. For the determination of the limits of the zones of the over flown region within range of the aircraft in case of engine failure, it receives from the navigation equipment 64 of the aircraft, the main flight parameters including the position of the aircraft in terms of latitude, longitude and altitude, and the direction and the amplitude of its speed vector. On the basis of these flight parameters and of instructions if any originating from the pilot of the aircraft, it determines at each instant the position on the surface of the terrestrial globe, the orientation and the dimensions of a zone of deployment in which to search for the limits of the zones accessible in the event of an engine failure. It subsequently determines the shape of the non-maneuverability zones attached to the current position of the aircraft on the basis of the flight parameters delivered by the navigation equipment 64 as well of its knowledge of the performance of the aircraft in case of engine failure. It subsequently extracts from the information from the database of elevations of the terrain and the regulated flyover zones 61, a geographical locating grid on which it charts the contours of the zones of non-maneuverability and of the regulated flyover zones so as to construct an image of zones to be circumvented. It estimates, for the various points of this image of zones to be circumvented, the vertical height margins with respect to the elevations of the terrain which would remain to the aircraft were it to reach these points, through the application of a propagation distance transform with static constraints resulting from the zones to be circumvented and dynamic constraints resulting from an imposed vertical flight profile, typical of an engine failure, from a source point near the current position of the aircraft. It subsequently compares the estimates of vertical margins obtained for the various points of the image with an arbitrary threshold so as to assign the points whose vertical margin estimates are greater than the threshold to the zones within range of the aircraft in case of engine failure and the other points to the zones out of range of the aircraft in case of engine failure. It subsequently determines the contours of the zones within range of the aircraft in case of engine failure with respect to the locating grid. Finally, it formulates a pop-up image of the zone flown over on which it displays the contours of the zones accessible in case of engine failure. The computer may possibly be linked to a TAWS system which provides it with the contours of zones at risk of ground collision to be incorporated with the pop-up image of the flown over zone displayed on the viewing screen 62.

When the aircraft is equipped with a system for preventing ground collisions formulating avoidance solutions, the lengths of the trajectories of the avoidance solutions proposed are compared with the estimates of curvilinear distances obtained by means of the propagation distance transform applied under static and dynamic constraints, so as to permit the circumventing of any additional obstacles identified.

The invention claimed is:

1. A method of aiding navigation for aircraft comprises:
   rendering on a display a navigation map formulated on the basis of:
      database elements of terrain elements belonging to a same region of deployment;
      contours of out of range zones, the out of range zones being sets of points of the navigation map that are assigned an estimate of vertical margin of height, with respect to the flown over relief, below an arbitrary threshold height, the estimate of vertical margin based upon a map of vertical margins obtained by comparing a terrain altitude extracted from a database of terrain elevations and a scheduled altitude based upon a preset vertical flight profile that includes a minimum descent slope;
   wherein the map of vertical margins is generated on the basis of a map of curvilinear distances obtained by applying a propagation distance transform based upon the current position of the aircraft, non-maneuverable zones to be circumvented, and the preset vertical flight profile in compliance with the vertical margin threshold;
   wherein the non-maneuverable zones are situated in proximity to the current position of the aircraft, are determined as a function of inertia, heading, course, and speed of the aircraft, as well as the performance of the aircraft in case of engine failure, and
   wherein the non-maneuverable zones are delimited, to the right and to the left of the current position of the aircraft, by a ground projection of the tightest possible lateral turning trajectories that are acceptable for the aircraft having regard to an exceptional situation of engine failure and a minimum of aircraft occupant comfort.

2. The method according to claim 1, wherein the map of vertical margins is established on the basis of a map of curvilinear distances obtained by:
   applying a propagation distance transform to points of a working image derived from the terrain elevations database with a point in the neighborhood of the current position of the aircraft as an origin, static constraints including regulated overfly zones and non-maneuverable zones situated in the neighborhood of the current position of the aircraft, and a dynamic constraint comprising the preset vertical flight profile in compliance with the vertical margin threshold.

3. The method according to claim 1, further comprising:
   regarding as out of range zones sets of points of the curvilinear distance map that are assigned estimates of curvilinear distance exhibiting discontinuities with respect to points of the immediate neighborhood.

4. The method according to claim 1, applied to an aircraft equipped with a system for preventing ground collisions formulating avoidance solutions, in the method further comprising:
   comparing the lengths of the trajectories of the avoidance solutions proposed by the ground collisions prevention system with the estimates of curvilinear distances made during the application of the distance transform, so as to avoid additional obstacles.

5. The method according to claim 1, further comprising:
   supplementing the out of range zones with a lateral margin taking into account limitation to the freedom of lateral maneuver due to the possible presence of reliefs in the out of range zones.

6. The method according to claim 5, wherein the lateral margin has a width of five nautical miles.

7. The method according to claim 5, wherein the lateral margin has a width corresponding to the lateral-wise precision, of the trajectory tracking by the equipment onboard the aircraft.

8. The method according to claim 5, wherein the lateral margin has a width corresponding to the minimum lateral distance allowing the aircraft to describe a diversion aerodrome.

9. The method according to claim 1, wherein the contours of the out of range zones include an external margin delimiting the neighborhoods of the out of range zones where the aircraft affected by an engine failure does not have complete freedom of lateral deployment.

10. The method according to claim 1, further comprising endowing the contours of the out of range zones with a textured wire-like representation.

11. The method according to claim 10, further comprising endowing the contours of the out of range zones with interior and exterior borders of different aspects.

12. The method according to claim 1, further comprising superimposing the contours of the out of range zones on zones determined by a ground collision prevention system as representing a danger.

13. The method according to claim 1, wherein determining the non-maneuverable zones on either side of the current position of the aircraft includes determining cycloidal arcs of a ground trace of each of two tightest right and left lateral turns permitted by a residual performance of the aircraft in case of an engine failure.

* * * * *